March 3, 1931.  R. R. McLAMARRAH  1,795,225
TRACTOR PLOW GUIDE
Filed May 13, 1930   4 Sheets-Sheet 1
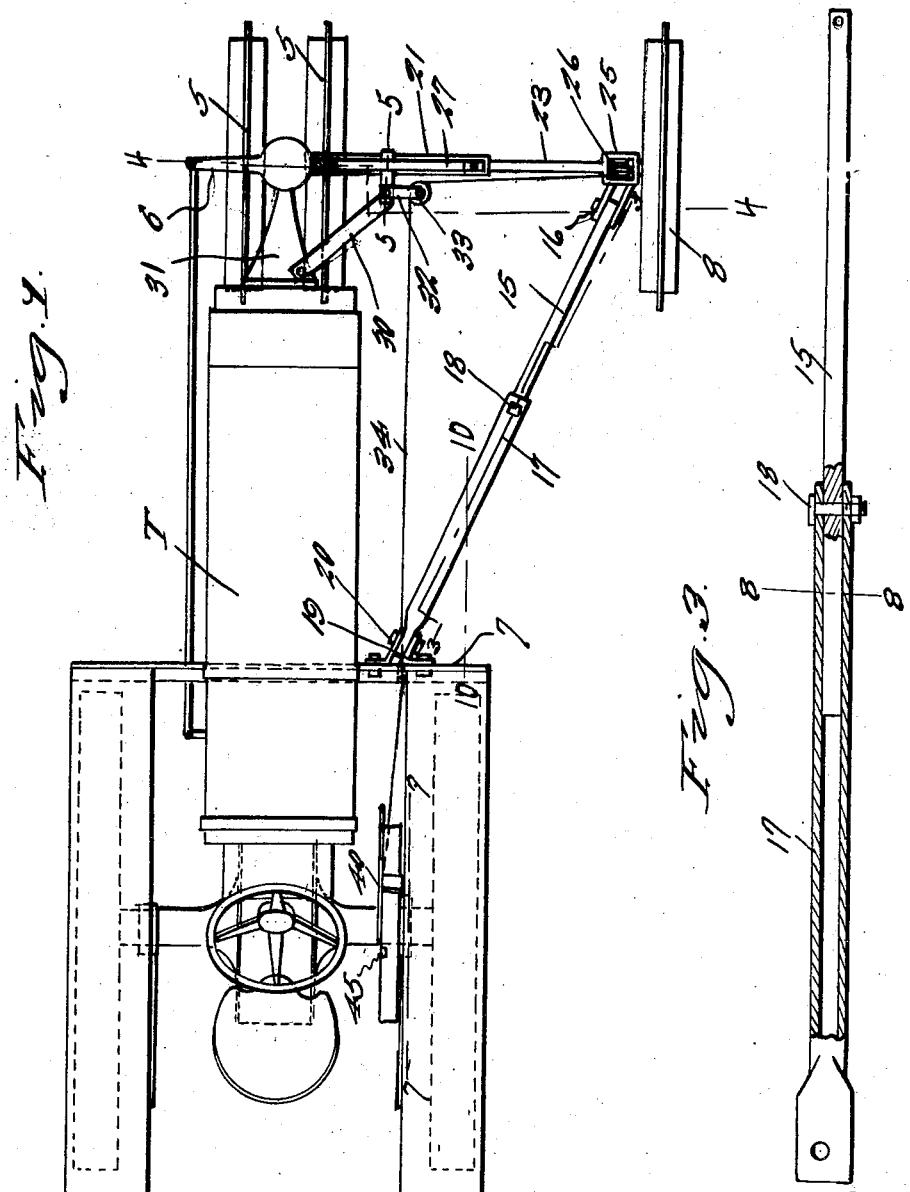
Inventor
Robert R. McLamarrah
By Clarence A. O'Brien
Attorney

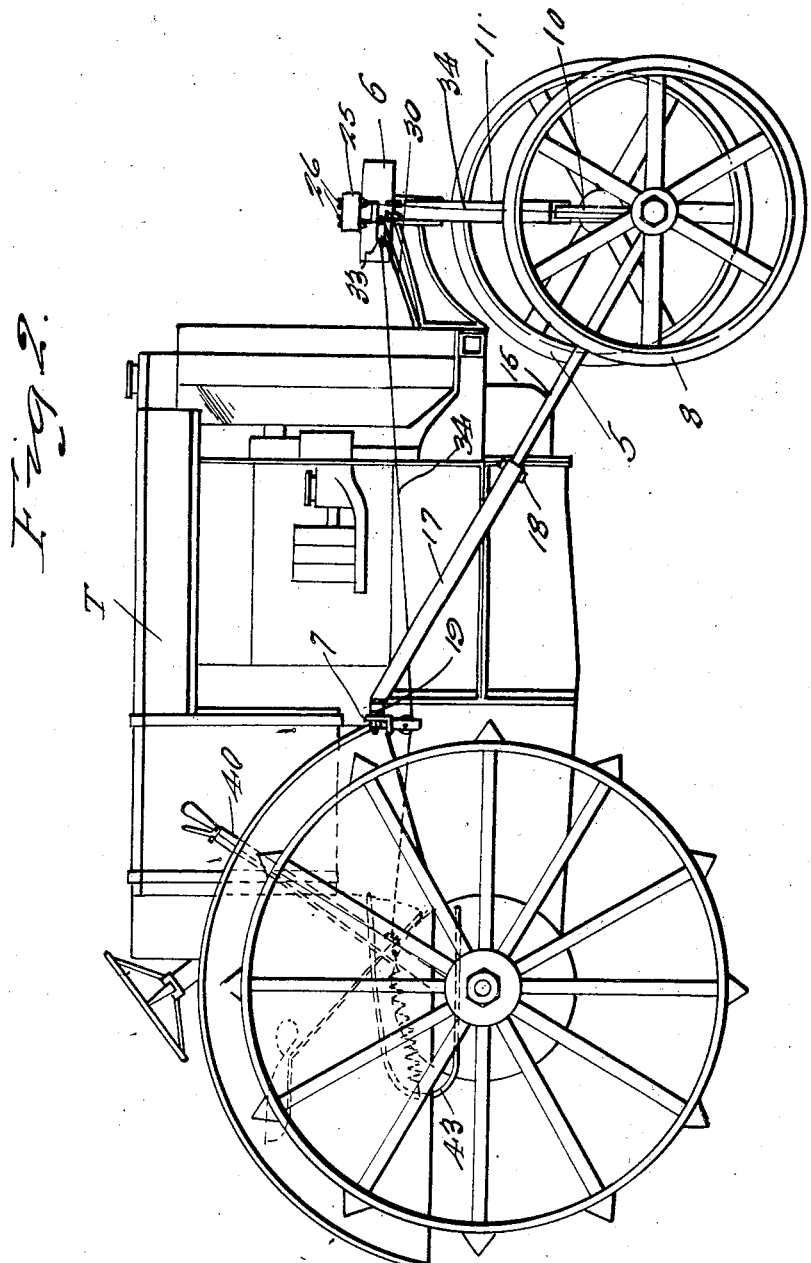

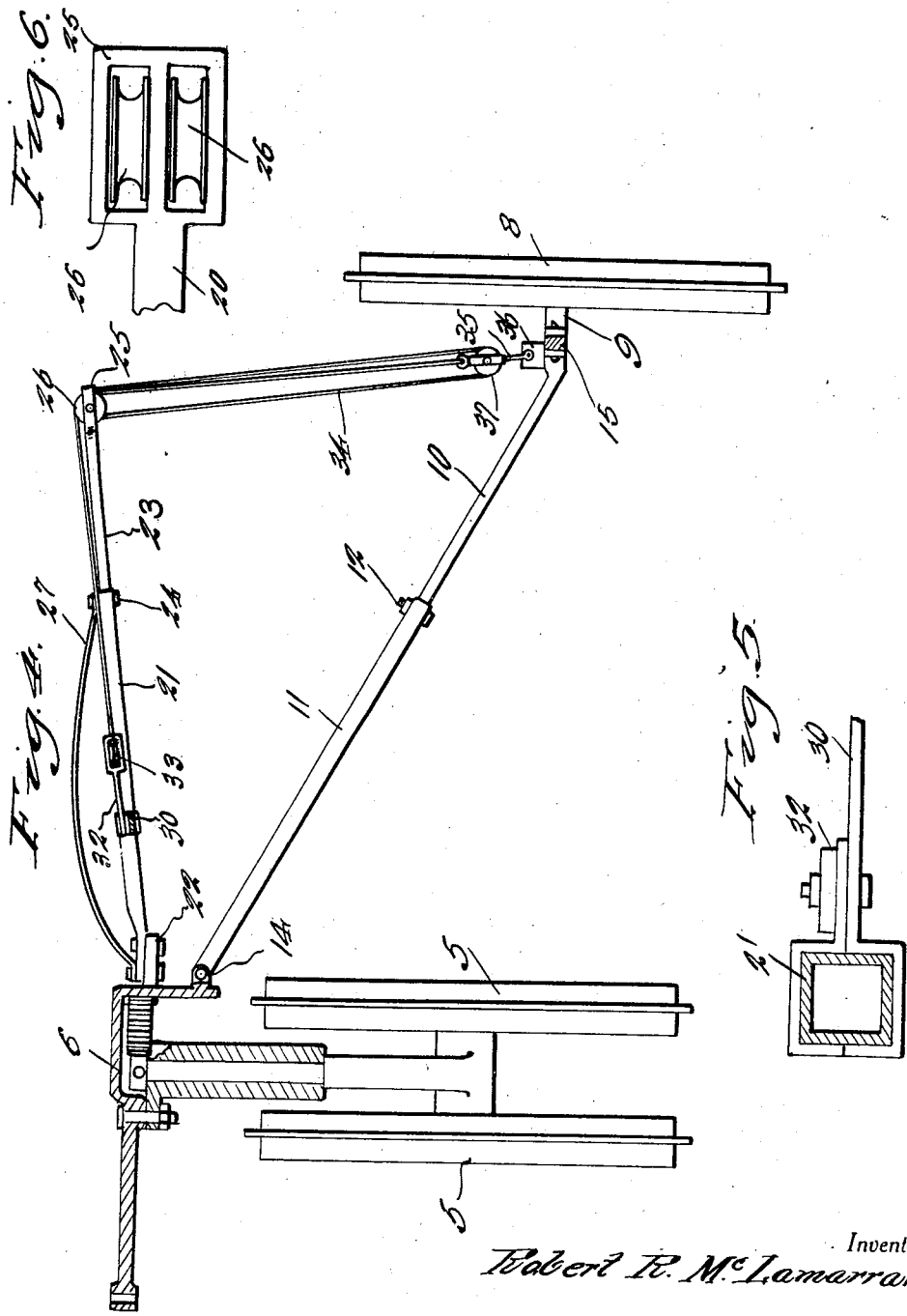

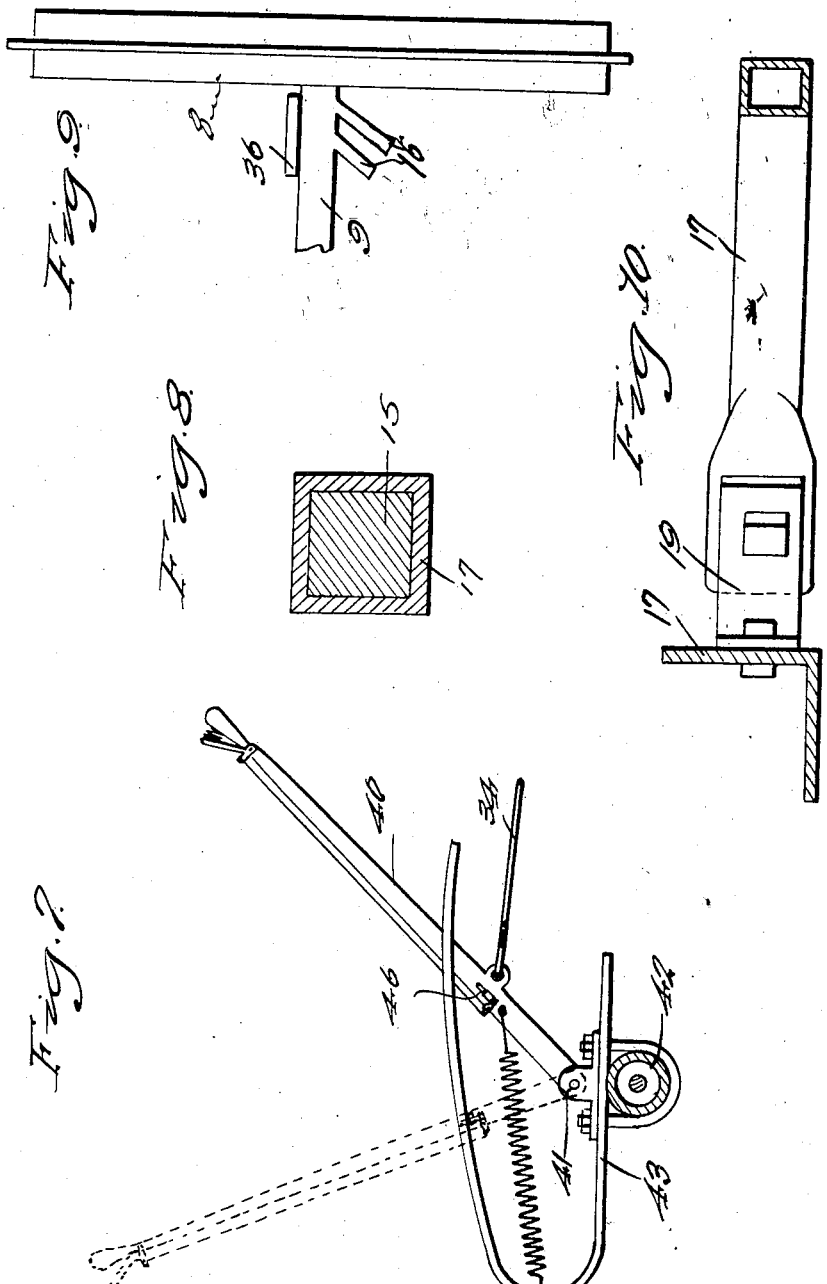

Patented Mar. 3, 1931

1,795,225

UNITED STATES PATENT OFFICE

ROBERT R. McLAMARRAH, OF WOONSOCKET, SOUTH DAKOTA

TRACTOR-PLOW GUIDE

Application filed May 13, 1930. Serial No. 452,006.

The present invention relates to tractor plow guides or a steering device for tractors adapted to be operatively connected with the front wheels of a tractor and to be used for automatically guiding the tractor when it is used for hauling a plow. The steering device is adapted to follow in the last furrow turned by the plow on its preceding round or along the field.

The prime object of the invention resides in the provision of an apparatus of this nature which is easy to manipulate and adjust, thoroughly efficient and reliable in use and operation, strong and durable, and otherwise adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of a plow showing my improved apparatus mounted thereon, Figure 2 is a side elevation of the tractor and apparatus, Figure 3 is a detail sectional view taken substantially on the line 3—3 of Figure 1, Figure 4 is a vertical transverse section taken substantially on the line 4—4 of Figure 1, Figure 5 is a detail section taken substantially on the line 5—5 of Figure 1, Figure 6 is a plan view of the outer end of the pulley bracket, Figure 7 is a detail sectional view taken substantially on the line 7—7 of Figure 1, Figure 8 is a detail transverse section taken substantially on the line 8—8 of Figure 3, Figure 9 is a top plan view of the guide wheel showing a portion of the axle bar extending therefrom, Figure 10 is a sectional view taken substantially on the line 10—10 of Figure 1.

Referring to the drawing in detail it will be seen that the letter T denotes generally a conventional form of tractor comprising the front dirigible wheels 5 controlled by a steering arm casting 6 in the usual well known manner. The numeral 7 denotes a scraper bar which is also part of the tractor.

The numeral 8 denotes the guide wheel which is journalled on the extremity of an axle bar 9 having an oblique extension 10 receivable in a hollow bar 11 and adjustable in respect thereto by means of a bolt 12. The hollow bar 11 is pivotally engaged as at 14 with the steering arm casting 6. A bar 15 is pivotally engaged between the ears 16 extending from the axle bar 9. The bar 15 is slidably received in a hollow bar 17 and held in a different adjusted position by a bolt 18. The hollow bar 17 has a reduced end extension 19 pivotally engaged between brackets 20 on said scraper bar 7.

The bars 15 and 17 form an adjustable brace. An adjustable bracket comprises a hollow bar 21 bolted to a lug 22 projecting from the casting 6 and having adjustably mounted therein a bar 23 by means of a bolt 24. The bar 23 terminates in a frame 25 in which is journalled a pair of pulleys 26. A brace 27 of the bowed type is engaged with the bolt 24 and with one of the bolts in the projection 22.

An arm 30 is mounted on casting 31 forming part of the tractor and supports a pulley bracket structure 32 on the bar 21, the pulley being denoted by the numeral 33. A cable 34 has one end anchored and a pulley frame 35 attached to a lip 36 rising from the axle bar 9. A pulley 37 is in the frame 35. Said cable 34 rises from the frame 35 over one of the pulleys 26 and downwardly over the pulley 37 and then upwardly over the other pulley 26 and then over the pulley 33 attached to an intermediate portion of a lever 40 which is rockable on a bracket 41 clamped on a portion of its tractor indicated by the numeral 42. A somewhat U-shaped member 43 is also anchored on the portion 42 with the bracket 41 and extends upwardly and forwardly and in the forwardly extending portion there is formed a notch 45 to cooperate with the detent structure 46 on the lever 40.

By moving the lever 40 rearwardly to the dotted line position shown in Figure 7 it will be seen that the guide wheel may be raised off the ground or out of the furrow.

When this guide wheel is in a furrow it will automatically guide the tractor to run parallel with said furrow as will be quite apparent.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other.

2. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other, a bracket projecting from the casting and having a frame on its end with a pair of pulleys journalled therein, a pulley frame anchored on the axle bar, a cable attached to the last mentioned pulley frame and journalled over one of the first mentioned pulleys and then over the third mentioned pulley and then back over the first mentioned pulleys and means for pulling on the cable to raise the guide wheel.

3. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other, a bracket projecting from the casting and having a frame on its end with a pair of pulleys journalled therein, a pulley frame anchored on the axle bar, a cable attached to the last mentioned pulley frame and journalled over one of the first mentioned pulleys and then over the third mentioned pulley and then back over the first mentioned pulleys and means for pulling on the cable to raise the guide wheel, said bracket being adjustably formed of the sections, one telescoped in the other.

4. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other, a bracket projecting from the casting and having a frame on its end with a pair of pulleys journalled therein, a pulley frame anchored on the axle bar, a cable attached to the last mentioned pulley frame and journalled over one of the first mentioned pulleys and then over the third mentioned pulley and then back over the first mentioned pulleys and means for pulling on the cable to raise the guide wheel, said bracket being adjustably formed of the sections, one telescoped in the other, means for holding the sections in different adjusted relationship.

5. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other, a bracket projecting from the casting and having a frame on its end with a pair of pulleys journalled therein, a pulley frame anchored on the axle bar, a cable attached to the last mentioned pulley frame and journalled over one of the first mentioned pulleys and then over the third mentioned pulley and then back over the first mentioned pulleys and means for pulling on the cable to raise the guide wheel, said bracket being adjustably formed of the sections, one telescoped in the other, means for holding the sections in different adjusted relationship, brace means pivotally engaged with a portion of the tractor and with the axle bar.

6. In combination with a tractor including a steering arm casting, a guide wheel, an axle bar on which the guide wheel is journalled, a hollow bar pivotally mounted to swing vertically on the casting and to receive the axle bar, means for holding the bars in adjusted relationship to each other, a bracket projecting from the casting and having a frame on its end with a pair of pulleys journalled therein, a pulley frame anchored on the axle bar, a cable attached to the last mentioned pulley frame and journalled over one of the first mentioned pulleys and then over the third mentioned pulley and then back over the first mentioned pulleys and means for pulling on the cable to raise the guide wheel, said bracket being adjustably formed of the sections, one telescoped in the other, means for holding the sections in different adjusted relationship, brace means pivotally engaged with a portion of the tractor and with the axle bar, said brace means being adjustable.

In testimony whereof I affix my signature.

ROBERT R. McLAMARRAH.